(12) United States Patent (10) Patent No.: US 9,053,211 B2
Goldfarb et al. (45) Date of Patent: Jun. 9, 2015

(54) SYSTEMS AND METHODS FOR EFFICIENT KEYWORD SPOTTING IN COMMUNICATION TRAFFIC

(75) Inventors: Eithan Goldfarb, Ness Ziona (IL); Yuval Altman, Herzeliya (IL); Itsik Horovitz, Holon (IL); Gur Yaari, Tel Aviv (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 647 days.

(21) Appl. No.: 12/792,796

(22) Filed: Jun. 3, 2010

(65) Prior Publication Data

US 2010/0313267 A1 Dec. 9, 2010

(30) Foreign Application Priority Data

Jun. 3, 2009 (IL) .......................................... 199115

(51) Int. Cl.
*G06F 17/30* (2006.01)
*H04L 29/06* (2006.01)

(52) U.S. Cl.
CPC .......... *G06F 17/30985* (2013.01); *H04L 63/00* (2013.01); *H04L 63/30* (2013.01); *H04L 63/306* (2013.01)

(58) Field of Classification Search
CPC ....... H04L 63/30; H04L 63/306; H04L 43/04; H04L 43/028; G06F 17/30
USPC ..................................................... 726/22–23
See application file for complete search history.

(56) References Cited

U.S. PATENT DOCUMENTS

| | | | |
|---|---|---|---|
| 3,594,919 | A | 7/1971 | De Bell et al. |
| 3,705,271 | A | 12/1972 | De Bell et al. |
| 4,510,351 | A | 4/1985 | Costello et al. |
| 4,684,349 | A | 8/1987 | Ferguson et al. |
| 4,694,483 | A | 9/1987 | Cheung |
| 4,763,353 | A | 8/1988 | Canale et al. |
| 4,815,120 | A | 3/1989 | Kosich |
| 4,924,488 | A | 5/1990 | Kosich |
| 4,953,159 | A | 8/1990 | Hayden et al. |
| 5,016,272 | A | 5/1991 | Stubbs et al. |

(Continued)

FOREIGN PATENT DOCUMENTS

| | | |
|---|---|---|
| CA | 2262044 | 10/1999 |
| EP | 0453128 A2 | 10/1991 |

(Continued)

OTHER PUBLICATIONS

"Customer Spotlight: Navistar International," Web page, unverified print date of Apr. 1, 2002.

(Continued)

*Primary Examiner* — Harunur Rashid
(74) *Attorney, Agent, or Firm* — Meunier Carlin & Curfman

(57) ABSTRACT

Methods and systems related to keyword searching processes. A list of keywords may be first represented by a set of short substrings. The substrings are selected such that an occurrence of a substring indicates a possible occurrence of one or more of the keywords. Input data may be initially pre-processed, so as to identify locations in the input data in which the substrings occur. Then, the identified locations are searched for occurrences of the actual keywords. The pre-processing scheme enables the keyword search process to search only in the identified locations of the substrings instead of over the entire input data.

14 Claims, 2 Drawing Sheets

(56) References Cited

U.S. PATENT DOCUMENTS

| | | |
|---|---|---|
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,884,032 A | 3/1999 | Bateman et al. |
| 5,907,680 A | 5/1999 | Nielsen |
| 5,918,214 A | 6/1999 | Perkowski |
| 5,923,746 A | 7/1999 | Baker et al. |
| 5,933,811 A | 8/1999 | Angles et al. |
| 5,944,791 A | 8/1999 | Scherpbier |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,044,355 A | 3/2000 | Crockett et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,091,712 A | 7/2000 | Pope et al. |
| 6,108,711 A | 8/2000 | Beck et al. |
| 6,122,665 A | 9/2000 | Bar et al. |
| 6,122,668 A | 9/2000 | Teng et al. |
| 6,278,772 B1 | 8/2001 | Bowater et al. |
| 6,411,724 B1 | 6/2002 | Waithilingam et al. |
| 6,628,777 B1 | 9/2003 | McIllwaine et al. |
| 6,697,796 B2 | 2/2004 | Kermani |
| 6,766,012 B1 | 7/2004 | Crossley |
| 6,772,396 B1 | 8/2004 | Cronin et al. |
| 6,775,377 B2 | 8/2004 | McIllwaine et al. |
| 6,785,677 B1 | 8/2004 | Fritchman |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,870,916 B2 | 3/2005 | Henrikson et al. |
| 6,871,229 B2 | 3/2005 | Nisani et al. |
| 6,901,438 B1 | 5/2005 | Davis et al. |
| 6,959,078 B1 | 10/2005 | Eilbacher et al. |
| 6,965,886 B2 | 11/2005 | Govrin et al. |
| 6,970,829 B1 | 11/2005 | Leamon |
| 7,058,652 B2 | 6/2006 | Czarnecki et al. |
| 7,092,509 B1 | 8/2006 | Mears et al. |
| 7,308,446 B1 * | 12/2007 | Panigrahy et al. ............... 1/1 |
| 7,346,531 B2 | 3/2008 | Jacobs |
| 7,457,404 B1 | 11/2008 | Hession et al. |
| 2001/0000962 A1 | 5/2001 | Rajan |
| 2001/0032335 A1 | 10/2001 | Jones |
| 2001/0043697 A1 | 11/2001 | Cox et al. |
| 2002/0019737 A1 | 2/2002 | Stuart et al. |
| 2002/0038363 A1 | 3/2002 | MacLean |
| 2002/0052948 A1 | 5/2002 | Baudu et al. |
| 2002/0065911 A1 | 5/2002 | Von Klopp et al. |
| 2002/0065912 A1 | 5/2002 | Catchpole et al. |
| 2002/0128925 A1 | 9/2002 | Angeles |
| 2002/0143925 A1 | 10/2002 | Pricer et al. |
| 2002/0163913 A1 * | 11/2002 | Oh ........................... 370/392 |
| 2002/0165954 A1 | 11/2002 | Eshghi et al. |
| 2003/0055883 A1 | 3/2003 | Wiles et al. |
| 2003/0079020 A1 | 4/2003 | Gourraud et al. |
| 2003/0144900 A1 | 7/2003 | Whitmer |
| 2003/0154240 A1 | 8/2003 | Nygren et al. |
| 2004/0083101 A1 | 4/2004 | Brown et al. |
| 2004/0100507 A1 | 5/2004 | Hayner et al. |
| 2004/0165717 A1 | 8/2004 | McIlwaine et al. |
| 2004/0179477 A1 * | 9/2004 | Lincoln et al. ............. 370/241 |
| 2004/0202308 A1 | 10/2004 | Baggenstoss et al. |
| 2004/0249650 A1 | 12/2004 | Freedman et al. |
| 2005/0069119 A1 | 3/2005 | Erhart et al. |
| 2005/0108518 A1 | 5/2005 | Pandaya et al. |
| 2005/0013560 A1 | 6/2005 | Lee et al. |
| 2005/0120017 A1 | 6/2005 | Motoki |
| 2006/0062376 A1 | 3/2006 | Pickford |
| 2006/0239440 A1 | 10/2006 | Shaffer et al. |
| 2007/0043714 A1 | 2/2007 | Stanton et al. |
| 2008/0208850 A1 * | 8/2008 | Boyce ............................. 707/6 |
| 2009/0052454 A1 * | 2/2009 | Pourcher et al. ............. 370/392 |
| 2009/0063151 A1 * | 3/2009 | Arrowood et al. ........... 704/254 |
| 2009/0157673 A1 * | 6/2009 | Boyce ............................. 707/6 |
| 2009/0306984 A1 | 12/2009 | Mark et al. |

FOREIGN PATENT DOCUMENTS

| | | |
|---|---|---|
| EP | 0773687 A2 | 5/1997 |
| EP | 0989720 | 3/2000 |
| GB | 2369263 | 5/2002 |
| WO | 9843380 | 11/1998 |
| WO | 0016207 | 3/2000 |

OTHER PUBLICATIONS

DKSystems Integrates QM Perception with OnTrack for Training, Web page, unverified print date of Apr. 1, 2002, unverified cover date of Jun. 15, 1999.

"OnTrack Online Delivers New Web Functionality," Web page, unverified print date of Apr. 2, 2002, unverified cover date of Oct. 5, 1999.

"Price Waterhouse Coopers Case Study: The Business Challenge," Web page, unverified cover date of 2000.

Abstract, net.working: "An Online Webliography," Technical Training pp. 4-5 (Nov./Dec. 1998).

(56) References Cited

OTHER PUBLICATIONS

Adams et al., "Our Turn-of-the-Century Trend Watch" Technical Training, pp. 46-47 (Nov./Dec. 1998).
Barron, "The Road to Performance: Three Vignettes," Technical Skills and Training, pp. 12-14 (Jan. 1997).
Bauer, "Technology Tools: Just-in-Time Desktop Training is Quick, Easy, and Affordable," Technical Training, pp. 8-11 (May/Jun. 1998).
Beck et al., "Applications of AI in Education," AMC Crossroads vol. 1:1-13 (Fall 1996), Web page, unverified print date of Apr. 12, 2002.
Benson and Cheney, "Best Practices in Training Delivery," Technical Training pp. 14-17 (Oct. 1996).
Bental and Cawsey, "Personalized and Adaptive Systems for Medical Consumer Applications," Communications ACM 45(5):62-63 (May 2002).
Witness Systems promotional brochure for eQuality entitled "Building Customer Loyalty Through Business-Driven Recording of Multimedia Interactions in your Contact Center" (2000).
Blumenthal et al., "Reducing Development Costs with Intelligent Tutoring System Shells," pp. 1-5, Web page, unverified print date of Apr. 9, 2002, unverified cover date of Jun. 10, 1996.
Brusilovsky et al., "Distributed intelligent tutoring on the Web," Proceedings of the 8th World Conference of the AIED Society, Kobe, Japan, Aug. 18-22, pp. 1-9 Web page, unverified print date of Apr. 12, 2002, unverified cover date of Aug. 18-22, 1997.
Brusilovsky and Pesin, ISIS-Tutor: An Intelligent Learning Environment for CD/ISIS Users, @pp. 1-15 Web page, unverified print date of May 2, 2002.
Brusilovsky, "Adaptive Educational Systems on the World-Wide-Web: A Review of Available Technologies," pp. 1-10, Web Page, unverified print date of Apr. 12, 2002.
Byrnes et al., "The Development of a Multiple-Choice and True-False Testing Environment on the Web," pp. 1-8, Web page, unverified print date Apr. 12, 2002, unverified cover date of 1995.
Calvi and De Bra, "Improving the Usability of Hypertext Courseware through Adaptive Linking," ACM, unknown page numbers (1997).
Coffey, "Are Performance Objectives Really Necessary?" Technical Skills and Training pp. 25-27 (Oct. 1995).
Cohen, "Knowledge Management's Killer App," pp. 1-11, Web page, unverified print date of Apr. 12, 2002, unverified cover date of 2001.
Cole-Gomolski, "New ways to manage E-Classes," Computerworld 32(48):4344 (Nov. 30, 1998).
Cross, "Sun Microsystems—the SunTAN Story," Internet Time Group 8 (2001).
Cybulski and Linden, "Teaching Systems Analysis and Design Using Multimedia and Patterns," unknown date, unknown source.
De Bra et al., "Adaptive Hypermedia: From Systems to Framework," ACM (2000).
De Bra, "Adaptive Educational Hypermedia on the Web," Communications ACM 45(5):60-61 (May 2002).
Dennis and Gruner, "Computer Managed Instruction at Arthur Andersen & Company: A Status Report," Educational Technical, pp. 7-16 (Mar. 1992).
Diessel et al., "Individualized Course Generation: A Marriage Between CAL and ICAL," Computers Educational 22(1/2) 57-64 (1994).
Dyreson, "An Experiment in Class Management Using the World-Wide Web," pp. 1-12, Web page, unverified print date of Apr. 12, 2002.
E Learning Community, "Excellence in Practice Award: Electronic Learning Technologies," Personal Learning Network pp. 1-11, Web page, unverified print date of Apr. 12, 2002.
Eklund and Brusilovsky, "The Value of Adaptivity in Hypermedia Learning Environments: A Short Review of Empirical Evidence," pp. 1-8, Web page, unverified print date of May 2, 2002.
e-Learning the future of learning, THINQ Limited, London, Version 1.0 (2000).
Eline, "A Trainer's Guide to Skill Building," Technical Training pp. 34-41 (Sep./Oct. 1998).
Eline, "Case Study: Bridging the Gap in Canada's IT Skills," Technical Skills and Training pp. 23-25 (Jul. 1997).
Eline, "Case Study: IBT's Place in the Sun," Technical Training pp. 12-17 (Aug./Sep. 1997).
Fritz, "CB templates for productivity: Authoring system templates for trainers," Emedia Professional 10(8):6876 (Aug. 1997).
Fritz, "ToolBook II: Asymetrix's updated authoring software tackles the Web," Emedia Professional 10(2):102106 (Feb. 1997).
Gibson et al., "A Comparative Analysis of Web-Based Testing and Evaluation Systems," pp. 1-8, Web page, unverified print date of Apr. 11, 2002.
Hallberg and DeFlore, "Curving Toward Performance: Following a Hierarchy of Steps Toward a Performance Orientation," Technical Skills and Training pp. 9-11 (Jan. 1997).
Harsha, "Online Training "Sprints" Ahead," Technical Training pp. 27-29 (Jan./Feb. 1999).
Heideman, "Training Technicians for a High-Tech Future: These six steps can help develop technician training for high-tech work," pp. 11-14 (Feb./Mar. 1995).
Heideman, "Writing Performance Objectives Simple as A-B-C (and D)," Technical Skills and Training pp. 5-7 (May/Jun. 1996).
Hollman, "Train Without Pain: The Benefits of Computer-Based Training Tools," pp. 1-11, Web page, unverified print date of Mar. 20, 2002, unverified cover date of Jan. 1, 2000.
Koonce, "Where Technology and Training Meet," Technical Training pp. 10-15 (Nov./Dec. 1998).
Kursh, "Going the distance with Web-based training," Training and Development 52(3):5053 (Mar. 1998).
Larson, "Enhancing Performance Through Customized Online Learning Support," Technical Skills and Training pp. 25-27 (May/Jun. 1997).
Linton et al., "OWL: A Recommender System for Organization-Wide Learning," Educational Technical Society 3(1):62-76 (2000).
Lucadamo and Cheney, "Best Practices in Technical Training," Technical Training pp. 21-26 (Oct. 1997).
McNamara, "Monitoring Solutions: Quality Must Be Seen and Heard," Inbound/Outbound pp. 66-67 (Dec. 1989).
Merrill, "The New Component Design Theory: Instruction design for courseware authoring," Instructional Science 16:19-34 (1987).
Minton-Eversole, "IBT Training Truths Behind the Hype," Technical Skills and Training pp. 15-19 (Jan. 1997).
Mizoguchi, "Intelligent Tutoring Systems: The Current State of the Art," Trans. IEICE E73(3):297-307 (Mar. 1990).
Mostow and Aist, "The Sounds of Silence: Towards Automated Evaluation of Student Learning a Reading Tutor that Listens" American Association for Artificial Intelligence, Web page, unknown date Aug. 1997.
Mullier et al., "A Web base Intelligent Tutoring System," pp. 1-6, Web page, unverified print date of May 2, 2002.
Nash, Database Marketing, 1993, pp. 158-165, 172-185, McGraw Hill, Inc., USA.
Nelson et al., "The Assessment of End-User Training Needs," Communications ACM 38(7):27-39 (Jul. 1995).
O'Herron, "CenterForce Technologies' CenterForce Analyzer," Web page, unverified print date of Mar. 20, 2002, unverified cover date of Jun. 1, 1999.
O'Roark, "Basic Skills Get a Boost," Technical Training pp. 10-13 (Jul./Aug. 1998).
Pamphlet, "On Evaluating Educational Innovations," authored by Alan Lesgold, unverified cover date of Mar. 5, 1998.
Papa et al., "A Differential Diagnostic Skills Assessment and Tutorial Tool," Computer Education 18(1-3):45-50 (1992).
PCT International Search Report, International Application No. PCT/US03/02541, mailed May 12, 2003.
Phaup, "New Software Puts Computerized Tests on the Internet: Presence Corporation announces breakthrough Question Mark Web product," Web page, unverified print date of Apr. 1, 2002.
Phaup, "QM Perception Links with Integrity Training's WBT Manager to Provide Enhanced Assessments for Web-Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.

(56) References Cited

OTHER PUBLICATIONS

Phaup, "Question Mark Offers Instant Online Feedback for Web Quizzes and Questionnaires: University of California assist with Beta Testing, Server scripts now available to high-volume users," Web page, unverified print date of Apr. 1, 2002, unverified cover date of May 6, 1996.
Piskurich, "Now-You-See-'Em, Now-You-Don't Learning Centers," Technical Training pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," Technical Skills and Training pp. 6-8 (May/Jun. 1995).
Stormes, "Case Study: Restructuring Technical Training Using ISD," Technical Skills and Training pp. 23-26 (Feb./Mar. 1997).
Tennyson, "Artificial Intelligence Methods in Computer-Based Instructional Design," Journal of Instruction Development 7(3):17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," ACM pp. 194-198 (1997).
Uiterwijk et al., "The virtual classroom," InfoWorld 20(47):6467 (Nov. 23, 1998).
Unknown Author, "Long-distance learning," InfoWorld 20(36):7276 (1998).
Untitled, 10th Mediterranean Electrotechnical Conference vol. 1 pp. 124-126 (2000).
Watson and Belland, "Use of Learner Data in Selecting Instructional Content for Continuing Education," Journal of Instructional Development 8(4):29-33 (1985).
Weinschenk, "Performance Specifications as Change Agents," Technical Training pp. 12-15 (Oct. 1997).
Aspect Call Center Product Specification, "Release 2.0", Aspect Telecommunications Corporation, May 23, 1998, 798.
Metheus X Window Record and Playback, XRP Features and Benefits, 2 pages, Sep. 1994 LPRs.
"Keeping an Eye on Your Agents," Call Center Magazine, pp. 32-34, Feb. 1993 LPRs & 798.
Anderson: Interactive TVs New Approach, The Standard, Oct. 1, 1999.
Ante, "Everything You Ever Wanted to Know About Cryptography Legislation . . . (But Were too Sensible to Ask)", PC World Online, Dec. 14, 1999.
Berst, "It's Baa-aack. How Interactive TV is Sneaking Into Your Living Room", The AnchorDesk, May 10, 1999.
Berst, "Why Interactive TV Won't Turn You On (Yet)", The AnchorDesk, Jul. 13, 1999.
Borland and Davis, "US West Plans Web Services on TV", CNETNews.com, Nov. 22, 1999.
Brown, "Let PC Technology Be Your TV Guide", PC Magazine, Jun. 7, 1999.
Brown, "Interactive TV: The Sequel", NewMedia, Feb. 10, 1998.
Cline, "Deja vu—Will Interactive TV Make It This Time Around?", DevHead, Jul. 9, 1999.
Crouch, "TV Channels on the Web", PC World, Sep. 15, 1999.
D'Amico, "Interactive TV Gets $99 set-top box", IDG.net, Oct. 6, 1999.
Davis, "Satellite Systems Gear Up for Interactive TV Fight", CNETNews.com, Sep. 30, 1999.
Diederich, "Web TV Data Gathering Raises Privacy Concerns", ComputerWorld, Oct. 13, 1998.
EchoStar, "MediaX Mix Interactive Multimedia With Interactive Television", PRNews Wire, Jan. 11, 1999.
Furger, "The Internet Meets the Couch Potato", PCWorld, Oct. 1996.
"Hong Kong Comes First with Interactive TV", Sci-Tech, Dec. 4, 1997.
Needle, "Will the Net Kill Network TV?" PC World Online, Mar. 10, 1999.
Notification of Transmittal of the International Search Report and the Written Opinion of the International Searching Authority, dated Jun. 6, 2008.
"Setting up switched port analyzer for monitoring and recording IP-ICD agents on the Cisco ICS 7750", Cisco Systems, Nov. 22, 2002. http://www.cisco.com/en/US/docs/routers/access/ics7750/software/notes/icsspan.html.
"NICE announces the next generation of active VoIP recording solutions", Press Release, NICE Systems, Mar. 14, 2006. http://www.nice.com/news/show_pr.php?id=581.
"NICE Systems announces interoperability of its VoIP recording technology with Cisco Systems' customer contact software platform", Business Wire, Jul. 3, 2001. http://findarticles.com/p/articles/mi_m0EIN/is_2001_July_3/ai_76154034.
"NICE and Cisco ICM/IPCC integration", (Feb. 2003). http://www.cisco.com/en/US/solutions/collateral/ns340/ns394/ns165/ns45/ns14/net_brochure09186a00800a3292.pdf.
Extended European Search Report, dated Jan. 5, 2011 in connection with Application No. EP10251030.
Definitions of and Synonyms for "Experience" downloaded from http://www.merriam-webster.com/dictionary/experience, http://www.oxforddictionaries.com/definition/experience?view=uk and http://thesaurus.com/browse/experience on Jan. 28, 2011.
Aho, Alfred V. et al., "Efficient String Matching: An Aid to Bibliographic Search," Communications of the Association for Computing Machinery, ACM, New York, NY, vol. 18, No. 6, Jun. 1, 1975, pp. 333-340.
Yu, Fang et al., "Gigabit Rate Packet Pattern-Matching Using TCAM," Proceedings of the 12th IEEE International Conference on Network Protocols, ICNP, Oct. 5, 2004, 10 pages.

\* cited by examiner

FIG. 1

![Analytics System diagram: Network cloud (24) → NIC (36) → MEMORY (40) → PROCESSOR containing CACHE (52) with KEYWORD SUBSTRING FLAG LIST (44, 48) → user workstation (32, 56, 60); labeled 20, 28]

FIG. 2

| | |
|---|---|
| "000000000000000000000000" | 0 |
| "000000000000000000000001" | 1 |
| "000000000000000000000010" | 1 |
| "000000000000000000000011" | 0 |
| ... | ... |
| "111111111111111111111110" | 1 |
| "111111111111111111111111" | 0 |

$2^{24}$ VALUES ← (52)

SYSTEMS AND METHODS FOR EFFICIENT KEYWORD SPOTTING IN COMMUNICATION TRAFFIC

FIELD OF THE DISCLOSURE

The present disclosure relates generally to data processing, and particularly to methods and systems for detecting strings in data.

BACKGROUND OF THE DISCLOSURE

Keyword searching techniques are used in a wide variety of applications. For example, in some applications, communication traffic is analyzed in an attempt to detect keywords that indicate traffic of interest. Some data security systems attempt to detect information that leaks from an organization network by detecting keywords in outgoing traffic. Intrusion detection systems sometimes identify illegitimate intrusion attempts by detecting keywords in traffic.

Various keyword searching techniques are known in the art. For example, Aho and Corasick describe an algorithm for locating occurrences of a finite number of keywords in a string of text, in "Efficient String Matching: An Aid to Bibliographic Search," Communications of the ACM, volume 18, no. 6, June, 1975, pages 333-340, which is incorporated herein by reference. This technique is commonly known as the Aho-Corasick algorithm. As another example, Yu et al. describe a multiple-pattern matching scheme, which uses Ternary Content-Addressable Memory (TCAM), in "Gigabit Rate Packet Pattern-Matching using TCAM," Proceedings of the 12$^{th}$ IEEE International Conference on Network Protocols (ICNP), Berlin, Germany, Oct. 5-8, 2004, pages 174-183, which is incorporated herein by reference.

SUMMARY OF THE DISCLOSURE

An embodiment that is described herein provides a method, including:

representing a plurality of keywords by a list of substrings drawn from the keywords;

caching a set of flags, each flag indicating whether a respective substring occurs in one or more of the keywords, in an internal cache memory of a processor device;

identifying, using the processor device, locations in input data in which the substrings occur by comparing the input data with the cached flags; and searching at the identified locations for occurrences of the keywords, so as to find at least one of the keywords in the input data.

In some embodiments, the internal cache memory includes a Level-2 (L2) cache memory of the processor device. In an embodiment, caching the flags and identifying the locations include executing software code by the processor device. In another embodiment, the processor device includes hardware-implemented logic, and caching the flags and identifying the locations are performed by the hardware-implemented logic. In yet another embodiment, the substrings include n-bit prefixes of the keywords. In a disclosed embodiment, each flag indicates whether the respective substring occurs in at least one of multiple predefined offsets within the one or more keywords. In some embodiments, the method includes receiving communication traffic from a communication network and extracting the input data from the communication traffic.

In an embodiment, the input data includes multiple data packets, identifying the locations includes identifying a subset of the data packets in which the substrings occur, and searching at the identified locations includes searching in the identified subset of the data packets. In another embodiment, the method includes storing at least a part of the input data that includes the identified locations in a memory, and searching for the occurrences includes searching for the occurrences in at least the part of the input data stored in the memory. In yet another embodiment, responsively to finding one or more of the keywords in the input data, the method includes issuing an alert, presenting a part of the input data in which the keywords were found, and/or blocking a communication flow in which the keywords were found. In still another embodiment, some of the input data is discarded according to a pre-filtering criterion prior to identifying the locations.

There is additionally provided, in accordance with an embodiment that is described herein, apparatus, including:

an interface, which is configured to receive input data; and a processor, which includes an internal cache memory and is configured to cache in the internal cache memory a set of flags, which represents a list of substrings drawn from a plurality of keywords such that each flag indicates whether a respective substring occurs in one or more of the keywords, to identify locations in the input data in which the substrings occur by comparing the input data with the cached flags, and to search at the identified locations for occurrences of the keywords, so as to find at least one of the keywords in the input data.

There is also provided, in accordance with an embodiment that is described herein apparatus, including:

a pre-processing unit, which includes a cache memory and is configured to cache in the cache memory a set of flags, which represents a list of substrings drawn from a plurality of keywords such that each flag indicates whether a respective substring occurs in one or more of the keywords, to receive input data, and to identify locations in the input data in which the substrings occur by comparing the input data with the cached flags; and a post-processing unit, which is configured to search for occurrences of the keywords at the locations identified by the pre-processing unit, so as to find at least one of the keywords in the input data.

The present disclosure will be more fully understood from the following detailed description of the embodiments thereof, taken together with the drawings in which:

BRIEF DESCRIPTION OF THE DRAWINGS

FIG. 1 is a block diagram that schematically illustrates a system for keyword searching, in accordance with an embodiment of the present disclosure;

FIG. 2 is a diagram that schematically illustrates a substring flag list, in accordance with an embodiment of the present disclosure;

DETAILED DESCRIPTION OF EMBODIMENTS

Overview

Figure 3:
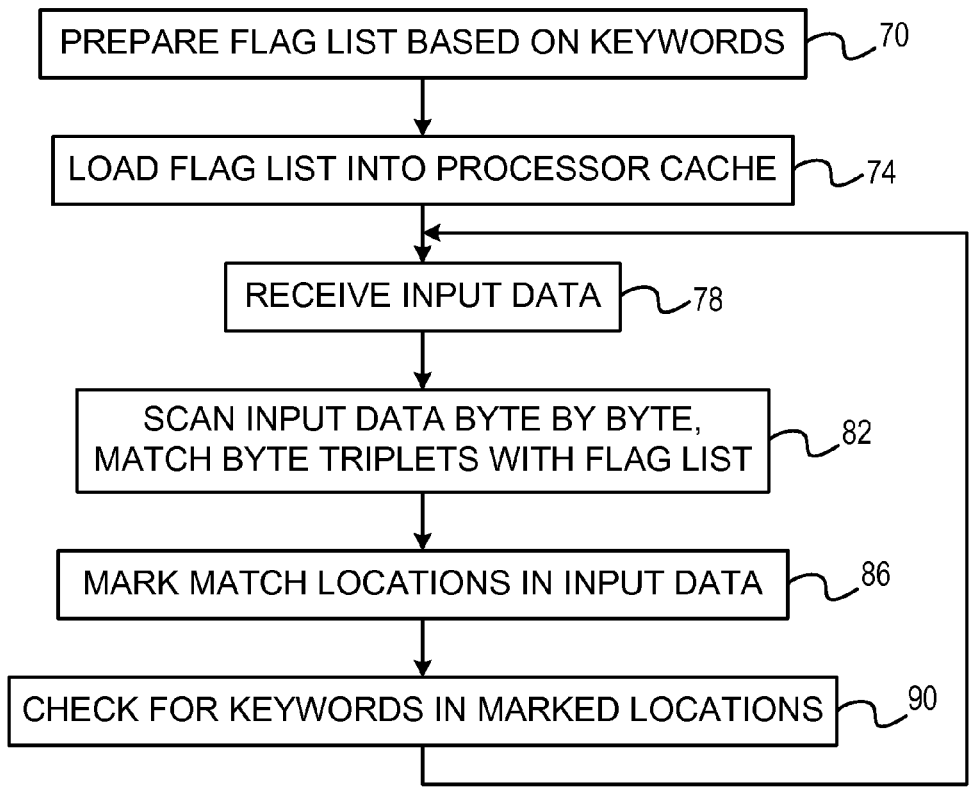
FIG. 3 is a flow chart that schematically illustrates a method for keyword searching, in accordance with an embodiment of the present disclosure.

Many keyword searching applications involve searching for a large number of keywords in a large volume of data. For example, it is not uncommon for an intrusion detection or leakage detection application to search high-bandwidth Internet traffic for a list of many thousands of keywords in real time. In many cases, the computational resources needed for such a task using known methods are prohibitive, and may limit the number of keywords and/or the traffic bandwidth that can be searched.

Embodiments that are described herein provide improved methods and systems, which reduce the computational complexity of keyword searching processes. In some embodiments, in order to search given input data for occurrences of a list of keywords, the list of keywords is first represented by a set of short substrings. The substrings are selected such that an occurrence of a substring indicates a possible occurrence of one or more of the keywords. For example, the set of substrings may comprise the prefixes of the keywords, i.e., the first n bits of each keyword. The input data is initially pre-processed, so as to identify locations in the input data in which the substrings occur. Then, the identified locations are searched for occurrences of the actual keywords.

In general, an occurrence of a substring (e.g., n-bit prefix) does not necessarily indicate an occurrence of a keyword. Nevertheless, the pre-processing scheme enables the keyword search process to search only in the identified locations of the substrings instead of over the entire input data. When using this sort of pre-processing, the volume of data to be searched can often be reduced by several orders of magnitude. (Although the description that follows refers to n-bit substrings, string matching is most commonly carried out using byte comparison operations, since bit manipulation is typically computationally costly.)

In some embodiments, the set of substrings is represented in a format that is compact enough to fit in an internal cache memory of a processor device. For example, a set of n-bit prefixes can be represented by a set of $2^n$ Boolean flags, such that each flag indicates whether one or more of the keywords begins with the respective n-bit prefix. When using three-byte (24-bit) prefixes, the set of $2^{24}$ flags occupies only 2 M bytes of memory, a size that readily fits in the internal cache of many processor devices. In these embodiments, the pre-processing scheme is carried out internally to the processor device using the internal cache. Such a scheme is fast and efficient since it does not need to fetch information related to the keywords from external memory.

The methods and systems described herein regard the input data as a stream of bytes, and identify substrings and keywords at the level of bytes. As such, the disclosed techniques can be applied to input data of any kind, regardless of the character set, encoding type or communication protocol used.

System Description

FIG. 1 is a block diagram that schematically illustrates a system 20 for keyword searching, in accordance with an embodiment of the present disclosure. System 20 receives communication traffic from a communication network 24, and attempts to detect predefined keywords in the traffic. When one or more keywords are detected, the system reports the detection to a user 28 using an operator terminal 32.

System 20 can be used, for example, in an application that detects data leakage from a communication network. In applications of this sort, the presence of one or more keywords in a data item indicates that this data item should not be allowed to exit the network. As another example, system 20 can be used in a communication interception intelligence application, which intercepts traffic of interest. In this sort of application, the presence of one or more of the keywords in a data item (e.g., a communication packet) indicates that the packet may be of interest. Additionally or alternatively, system 20 can be used in any other suitable application in which input data is searched for occurrences of keywords, such as in intrusion detection and prevention systems, detection of spam in electronic mail (e-mail) systems, or detection of inappropriate content using a dictionary of inappropriate words or phrases. Although the embodiments described herein refer mainly to processing of communication traffic, the disclosed techniques can also be used in other domains. For example, system 20 can be used for locating data of interest on storage devices, such as in forensic disk scanning applications.

Network 24 may comprise any suitable public or private, wireless or wire-line communication network, e.g., a Wide-Area network (WAN) such as the Internet, a Local-Area Network (LAN), a Metropolitan-Area Network (MAN), or a combination of network types. The communication traffic, to be used as input data by system 20, may be provided to the system using any suitable means. For example, the traffic may be forwarded to the system from a network element (e.g., router) in network 24, such as by port tapping or port mirroring. In alternative embodiments, system 20 may be placed in-line in the traffic path. These embodiments suitable, for example, for data leakage prevention applications, but can also be used in other applications.

Typically, network 24 comprises an Internet Protocol (IP) network, and the communication traffic comprises IP packets. The description that follows focuses on Transmission Control Protocol Internet Protocol (TCP/IP) networks and TCP packets. Alternatively, however, the methods and systems described herein can be used with other packet types, such as User Datagram Protocol (UDP) packets. In the example of FIG. 1, system 20 comprises a Network Interface Card (NIC) 36, which receives TCP packets from network 24. NIC 36 stores the incoming TCP packets in a memory 40, typically comprising a Random Access Memory (RAM). A processor device 44 searches the TCP packets stored in memory 40 and attempts to identify occurrences of predefined keywords in the packets.

Processor 44 pre-processes the packets stored in memory 40, so as to identify locations in memory 40 in which the keywords possibly occur. The pre-processing scheme uses a list of short substrings that are drawn from the keywords, and a list of flags that represent the substrings in compact form. The pre-processing scheme, as well as the substrings and flags, are described in detail below.

In the present example, processor device 44 comprises an internal cache memory 48. In some embodiments, processor 44 caches in cache 48 a list 52 of the flags representing the substrings. Caching the flags in the internal cache enables processor 44 to pre-process the input data using internal memory access operations, i.e., without fetching information related to the keywords from conventional RAM. As such, the pre-processing scheme is fast and efficient. In some embodiments, processor 44 comprises multi-level cache circuitry, and cache 48 comprises a Level-2 (L2) cache of the processor. Access to the L2 cache is typically faster than access to conventional RAM.

Following the pre-processing stage, processor 44 searches the identified locations in memory 40 for occurrences of the actual keywords. When the processor detects a given keyword in a given packet, it reports the detection to user 28 using an output device of terminal 32, such as a display 56. For example, the processor may issue an alert to the user and/or present the data item (e.g., packet or session) in which the keyword or keywords were detected. In some embodiments, processor 44 may take various kinds of actions in response to detecting keywords. For example, in a data leakage or intrusion prevention application, processor 44 may block some or all of the traffic upon detecting a keyword. User 28 may interact with system 20 using an input device of terminal 32, e.g., a keyboard 60. For example, the user may enter or modify the list of keywords.

Figure 4:
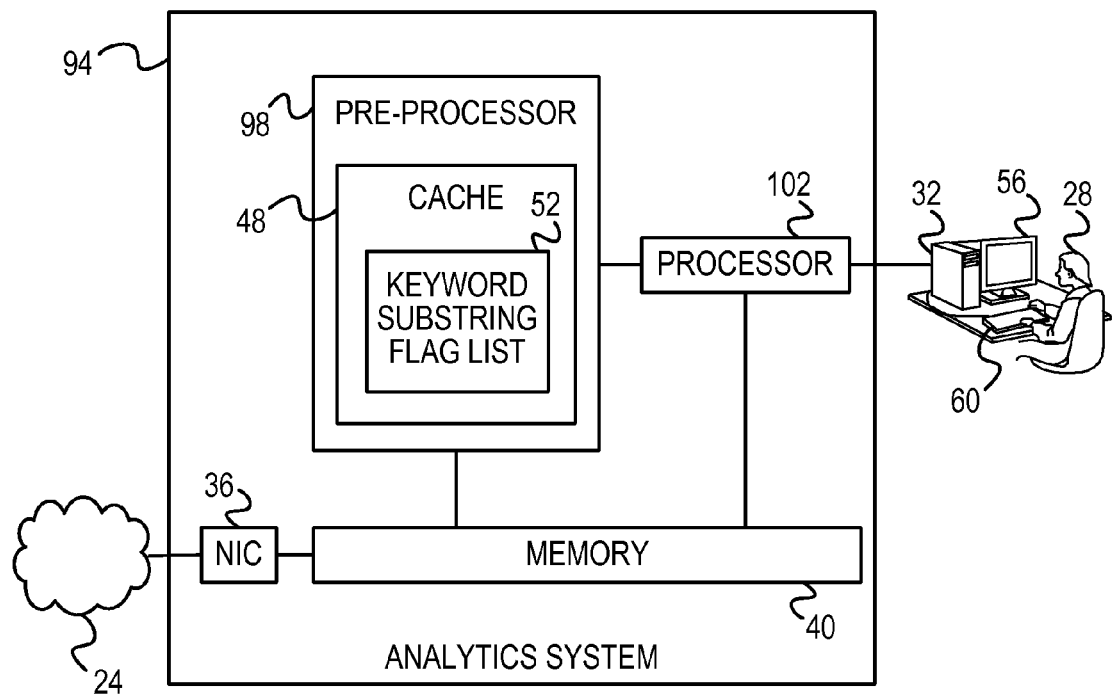
FIG. 4 is a block diagram that schematically illustrates a system for keyword searching, in accordance with an alternative embodiment of the present disclosure.

The system configuration shown in FIG. 1 is an example configuration, which is chosen purely for the sake of conceptual clarity. An alternative configuration, in which the input data is pre-processed by a hardware-based pre-processor, is shown in FIG. 4 below. Further alternatively, any other suitable configuration can be used. Generally, the different elements of system 20 may be carried out using software, hardware or a combination of hardware and software elements.

Efficient Keyword Pre-Processing Using Cached Flag List

In many practical applications, the number of keywords to be detected by system 20 is extremely large, sometimes on the order of tens of thousands or more. A given keyword may appear in the data in a variety of character sets (e.g., Latin, Russian or various Asian character sets) and encoding types (e.g., ASCII or Unicode). Moreover, the system is often requested to perform the search in real time over large volumes of data, such as over a high-bandwidth Internet traffic flow. The computational resources involved in keyword detection under such conditions are sometimes all but prohibitive, and may limit the maximum number of keywords, keyword size or searchable traffic bandwidth.

In some embodiments, processor 44 pre-processes the input data in order to focus on a relatively small number of locations in the data, which may contain keywords. Then, the processor searches for the keywords only in these locations. As a result, the keyword search can be performed over only a fraction of the input data, and the computational complexity involved is reduced accordingly.

In the pre-processing stage, processor 44 identifies occurrences of short substrings, rather than occurrences of entire keywords. The list of substrings is selected such that an occurrence of a substring indicates a possible (although not guaranteed) occurrence of a keyword. In the description that follows, the substrings comprise three-byte prefixes of the keywords. In some embodiments, the list of substrings is represented in a compact format, which enables processor 44 to store it in cache memory 48.

FIG. 2 is a diagram that schematically illustrates an example of flag list 52 that is cached in cache 48, in accordance with an embodiment of the present disclosure. List 52 comprises $2^{24}$ flags, which correspond to the $2^{24}$ possible three-byte prefixes that may or may not appear in the keywords. Each flag in list 52 indicates whether one or more of the keywords begins with the corresponding prefix. For example, the flag of prefix "000000000000000000000000" is "0", indicating that none of the keywords begins with the three bytes "000000000000000000000000". The flag of prefix "000000000000000000000001", on the other hand, is "1", indicating that one or more of the keywords begin with "000000000000000000000001".

Using this representation, a list of $2^{24}$ Boolean flags uniquely defines the list of three-byte prefixes that appear in the keywords. (Only the Boolean flags, and not the actual prefixes, are cached in cache 48.) In other words, by querying this list of $2^{24}$ flags, processor 44 can determine whether a given combination of twenty-four bits matches the first three bytes of any of Boolean flags occupies only 2 M bytes of memory, a size that readily fits in cache 48. When larger cache size is available, longer prefixes can also be used. In an example implementation, a 2 MB L2 cache can be used to cache a Boolean flags representing three-byte prefixes. A 16 MB L2 cache, for example, can be used to cache a list of $2^{32}$ Boolean flags representing four-byte prefixes.

Consider the present example, in which the input data is first searched for occurrences of three-byte (24-bit) prefixes. For a set of N keywords, only approximately $N/(2^{24})$ of the flags in list 52 will be "1". Thus, the flag list is extremely sparse, even for large numbers of keywords. As a result, the memory locations that will be identified in the pre-processing stage are only a small fraction of the total number of memory locations. This example demonstrates that the disclosed pre-processing scheme provides a significant reduction in the amount of data to be searched.

In the embodiments described herein, the substrings comprise three-byte prefixes of the keywords. In alternative embodiments, however, the substrings may refer to bit sequences in any other position in the keyword. For example, the substrings may comprise suffixes of the keywords, i.e., the last n bits of each keyword. In these embodiments, a given flag in list 52 is "1" if one or more keywords end with the corresponding bit sequence.

In some embodiments, a given flag in list 52 may be "1" if the corresponding substring (bit sequence) appears in at least one of two predefined keyword positions, usually at consecutive offsets. For example, a given flag may be set to "1" if the corresponding substring appears in the $1^{st}$, $2^{nd}$ and $3^{rd}$ bytes of at least one keyword, or in the $2^{nd}$, $3^{rd}$ and $4^{th}$ bytes of at least one keyword. Even with this technique, the flag list is still sufficiently sparse to provide considerable reduction in data volume. Repeating the comparison with two or more offset positions reduces the probability of randomly hitting a three-byte substring that appears in the list but is not really the beginning of a keyword.

FIG. 3 is a flow chart that schematically illustrates a method for keyword searching, in accordance with an embodiment of the present disclosure. The method begins with a preparation of flag list 52 based on the list of keywords to be searched, at a flag list preparation step 70. In a typical implementation, the substrings are three bytes long, and each keyword has a size of four or more bytes. Alternatively, however, any other suitable keyword and substring size can be used.

Flag list 52 is typically produced from the list of keywords in advance. The flag list can be prepared, for example, by user terminal 32, by processor 44 or by any other suitable processor. The flag list is loaded into cache memory 48 of processor 44, at a caching step 74. The list is typically provided to processor 44 via terminal 32 and loaded into the cache memory. In some embodiments, the flag list can be updated in response to changes in the list of keywords, e.g., when keywords are added or deleted.

System 20 receives communication traffic from network 24, at an input step 78. NIC 36 receives incoming IP packets and stores them in memory 40. Each IP packet is typically on the order of tens of bytes to several thousand bytes in size. The average packet size may be approximately 612 bytes. Alternatively, any other suitable packet sizes can also be used.

Processor 44 scans the IP packets stored in memory and attempts to identify occurrences of the substrings, at a substring matching step 82. Typically, processor 44 scans a given packet byte by byte, and compares each three-byte sequence in the packet to flag list 52. Since the flag list is cached in internal cache memory 48, these comparison operations are fast and efficient.

Processor 44 identifies the locations in the input data (i.e., the locations in memory 40) in which the substrings occur, at a location marking step 86. In the present example, if a given three-byte sequence in the packet matches one of the substrings (i.e., the flag corresponding to this three-byte sequence is "1"), the processor regards the memory location of this three-byte sequence as a possible occurrence of a keyword. As noted above, processor 44 may repeat the substring matching process for additional offset positions in the keyword, so as to reduce the probability of false matches (substring matches that do not correspond to actual keyword locations).

Processor 44 searches for occurrences of keywords in the memory locations identified at step 86 above, at a keyword search step 90. Processor 44 may search the identified locations using any suitable keyword searching method, such as using the above-cited Aho-Corasick algorithm. Other examples of keyword searching methods that can be used by processor 44 to implement step 90 comprise the Boyer-Moore or Set-Wise Boyer-Moore algorithms. Several such keyword searching schemes are described by Fisk and Verghese in "Applying Fast String Matching to Intrusion Detection," Los Alamos National Laboratory and the University of California, San Diego, 1009, which is incorporated herein by reference. Since this search is performed only at the memory locations in which substrings occurrences were found, rather than over the entire input data, the computational complexity of the search is reduced considerably.

Processor 44 may invoke the keyword search process in various ways. In some embodiments, the processor filters the incoming IP packets according to the pre-processing results. For example, the processor may apply keyword searching to packets in which substring occurrences were identified, and discard the other packets. Additionally or alternatively, the processor may report the actual locations of the substring occurrences within the packet to the keyword search process. In some embodiments, processor 44 searches within a given packet, starting from an identified substring location and searching for several tens of bytes (a length that typically depends on the longest anticipated keyword). This sort of searching further reduces the volume of text being searched for keywords.

Alternative System Configuration

FIG. 4 is a block diagram that schematically illustrates a system 94 for keyword searching, in accordance with an alternative embodiment of the present disclosure. System 94 comprises a pre-processor 98, which is typically implemented in hardware, such as using one or more Field-Programmable Gate Arrays (FPGAs) and/or Application-Specific Integrated Circuits (ASICs). Cache memory 48, which holds flag list 52, is implemented as part of the circuitry of pre-processor 98. Pre-processor carries out the data pre-processing functions described above. As noted above, the pre-processor functionality may also be carried out in software using a processor's built-in cache.

A processor 102 performs keyword searching in the memory locations indicated by the pre-processor. Processor 102 can thus be regarded as a post-processing unit, which operates on the output of pre-processor 98. Both pre-processor 98 and processor 102 access memory 40. In still another embodiment, the functionality of pre-processor 98 can be embodied in the circuitry of NIC 36.

In some embodiments, processors 44 and 102 and pre-processor 98 may comprise general-purpose processors, which are programmed in software to carry out the various functions described herein. The software may be downloaded to the processors in electronic form, over a network, for example, or it may, alternatively or additionally, be provided and/or stored on tangible media, such as magnetic, optical, or electronic memory. Processors 44 and 102 and/or pre-processor 98 may comprise a multi-processor device, which comprises multiple processing cores that operate in parallel, such as a multi-core Central Processing Unit (CPU), A Very Long Instruction Word (VLIW) processor or a Digital Signal Processor (DSP). Writing into memory 40 and into cache 48 causes a transformation in the states of the memory cells into which the data is written.

Although the embodiments described herein mainly address representing the substrings using Boolean flags, the substrings can be represented using any other compact representation that enables processor 44 to store them in cache 48.

In the embodiments described herein, the input data (e.g., TCP packets) is stored in a memory before it is pre-processed. In alternative embodiments, however, the input data may be pre-processed on the fly, as it is received by system 20, such as by suitable hardware logic. In these embodiments, nevertheless, the input data is stored temporarily in devices such as buffers or registers. In the present context, these components are also regarded as a sort of memory.

In some embodiments, the pre-processing techniques described herein can be combined with other kinds of pre-processing, in order to further reduce the volume of data to be analyzed. For example, incoming communication traffic can be initially filtered using various criteria in order to discard data that is unlikely to contain text of interest (or any text for that matter). Filtering may be based on the type of protocol or application associated with the traffic. For example, system 20 or 94 may discard incoming Real Time Protocol (RTP) traffic, traffic that is identified as being encrypted, or traffic associated with any other suitable application or protocol. Additionally or alternatively, traffic can be filtered according to any other suitable criteria, such as based on IP addresses associated with the traffic, port numbers associated with the traffic, or specific combinations of the above-mentioned criteria. After the initial filtering step, the system pre-processes the remaining data and identifies keywords using the disclosed techniques.

In some practical cases, incoming traffic may be compressed, e.g., using GZIP or other compression scheme. In some embodiments, system 20 or 94 identifies compressed traffic and decompresses it before applying pre-processing.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
    identifying substrings from within keywords, wherein each keyword comprises a string;
    caching a set of flags, each flag indicating whether a respective substring from the identified substrings occurs in one or more of the keywords, in an internal cache memory of a processor device;
    identifying, using the processor device, locations in input data in which the substrings occur by comparing the input data with the cached flags; and
    searching at the identified locations for occurrences of the keywords, so as to find at least one of the keywords in the input data wherein each flag indicates whether the respective substring occurs in at least one of multiple predefined offsets within the one or more keywords, wherein the input data comprises received communication network traffic, wherein the input data further comprises multiple data packets, wherein identifying the locations comprises identifying a subset of the data packets in which the substrings occur, and wherein searching at the identified locations comprises searching in the identified subset of the data packets; and further wherein incoming Real Time Protocol (RTP) traffic, traffic that is identified as being encrypted, or traffic associated with any other suitable application or protocol is discarded.

2. The method according to claim 1, wherein caching the flags and identifying the locations comprise executing software code by the processor device.

3. The method according to claim 1, wherein the processor device comprises hardware-implemented logic, and wherein caching the flags and identifying the locations are performed by the hardware-implemented logic.

4. The method according to claim 1, wherein the substrings comprise n-bit prefixes of the keywords.

5. The method according to claim 1, and comprising receiving communication traffic from a communication network and extracting the input data from the communication traffic.

6. The method according to claim 1, and comprising storing at least a part of the input data that includes the identified locations in a memory, wherein searching for the occurrences comprises searching for the occurrences in at least the part of the input data stored in the memory.

7. The method according to claim 1, and comprising, responsively to finding one or more of the keywords in the input data, performing at least one action selected from a group of actions consisting of:
 issuing an alert;
 presenting a part of the input data in which the keywords were found; and
 blocking a communication flow in which the keywords were found.

8. Apparatus, comprising:
 an interface, which is configured to receive input data; and
 a hardware processor, which comprises an internal cache memory and is configured to identify substrings from within keywords, wherein each keyword comprises a string, to cache in the internal cache memory a set of flags, such that each flag indicates whether a respective substring occurs in one or more of the keywords, to identify locations in the input data in which the substrings occur by comparing the input data with the cached flags, and to search at the identified locations for occurrences of the keywords, so as to find at least one of the keywords in the input data wherein each flag indicates whether the respective substring occurs in at least one of multiple predefined offsets within the one or more keywords, wherein the input data comprises received communication network traffic, wherein the input data further comprises multiple data packets, wherein identifying the locations comprises identifying a subset of the data packets in which the substrings occur, and wherein searching at the identified locations comprises searching in the identified subset of the data packets, and further wherein incoming Real Time Protocol (RTP) traffic, traffic that is identified as being encrypted, or traffic associated with any other suitable application or protocol is discarded.

9. The apparatus according to claim 8, wherein the processor is configured to run software code that caches the flags and identifies the locations.

10. The apparatus according to claim 8, wherein the processor comprises hardware-implemented logic, which is operative to cache the flags and identify the locations.

11. The apparatus according to claim 8, wherein the substrings comprise n-bit prefixes of the keywords.

12. The apparatus according to claim 8, wherein the interface is configured to receive communication traffic from a communication network and to extract the input data from the communication traffic.

13. The apparatus according to claim 8, and comprising a memory, wherein the interface is configured to store at least a part of the input data that includes the identified locations in the memory, and wherein the processor is configured to search for the occurrences in at least the part of the input data stored in the memory.

14. The apparatus according to claim 8, wherein the processor is configured to perform, responsively to finding one or more of the keywords in the input data, at least one action selected from a group of actions consisting of:
 issuing an alert;
 presenting a part of the input data in which the keywords were found; and
 blocking a communication flow in which the keywords were found.

* * * * *